Nov. 27, 1951  W. J. McCARTER  2,576,133
PORTABLE SPRAYING MACHINE
Filed March 5, 1948  3 Sheets-Sheet 1

William J. McCarter
INVENTOR.

BY *(signature)*
Attorneys

Nov. 27, 1951  W. J. McCARTER  2,576,133
PORTABLE SPRAYING MACHINE
Filed March 5, 1948  3 Sheets-Sheet 2
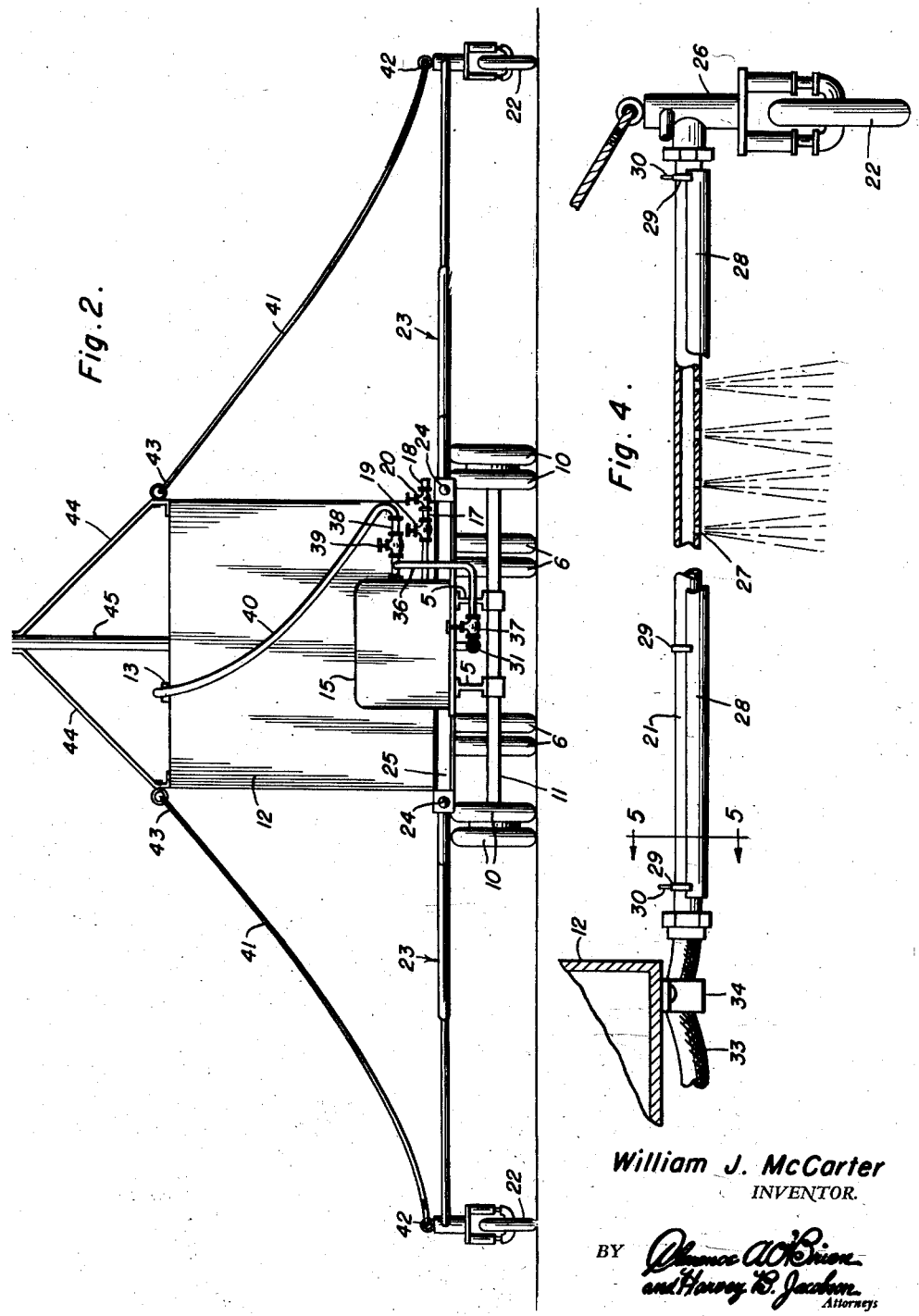
William J. McCarter
INVENTOR.

Nov. 27, 1951  W. J. McCARTER  2,576,133
PORTABLE SPRAYING MACHINE

Filed March 5, 1948  3 Sheets-Sheet 3

William J. McCarter
INVENTOR.

BY

Patented Nov. 27, 1951

2,576,133

UNITED STATES PATENT OFFICE 2,576,133

PORTABLE SPRAYING MACHINE

William J. McCarter, Galata, Mont.

Application March 5, 1948, Serial No. 13,151

1 Claim. (Cl. 299—41)

This invention relates to a portable wheeled spraying machine or apparatus adapted to be drawn over a field of growing plants for watering the same.

The primary object of the present invention is to provide a machine of the above character which is simple and compact in construction, easy to use, and efficient in operation.

Generally described, the machine embodies a vehicle frame including a pair of spaced longitudinal frame members supported at their forward ends by front steering and supporting wheels journaled on the ends of a horizontally swingable front axle having a forwardly extending draft tongue, and supported near their rear ends by rear supporting wheels journaled on the ends of a transverse rear axle. Mounted on and between the ends of the longitudinal frame members is a large water reservoir or tank having a top inlet and a bottom outlet at the rear thereof. Mounted on the rear ends of the longitudinal frame members directly behind the tank is a pumping unit of the type including an engine-driven pump having its inlet connected to the outlet of the tank by a valved conduit having a valved branch adapted to be connected by a hose to an outside source of water supply. Spray booms, having supporting caster wheels on their outer ends, extend laterally from opposite sides of the frame and are detachably and pivotally connected by guy rods to the frame for vertical swinging movement to rise and fall according to uneven conditions of the ground. A manifold is mounted longitudinally of the frame beneath the tank and has lateral branches at its front end flexibly and detachably coupled to the inner ends of the spray booms. A horizontal spray pipe is mounted transversely of and on the rear end of the frame behind the pumping unit and is connected intermediate its ends to the rear end of the manifold. Near its rear end, the manifold is connected to the outlet of the pump by a valved conduit having a valved branch adapted to have a hose coupled thereto for use in filling the tank from the outside source of water supply through the top inlet of said tank. Guy cables are provided to limit the downward movement of the spray booms and are detachably connected to brackets fixed on the top of the tank. Thus, the spray booms may be detached from the machine to facilitate travel of the same from place to place when not in use.

The exact nature of the present invention will become apparent from the following description when considered in connection with the accompanying drawings, in which:

Figure 2 is a vertical transverse section taken on line 2—2 of Figure 1;

Figure 4 is an enlarged fragmentary section, partly broken away and in section, taken on line 4—4 of Figure 3;

Figure 1:
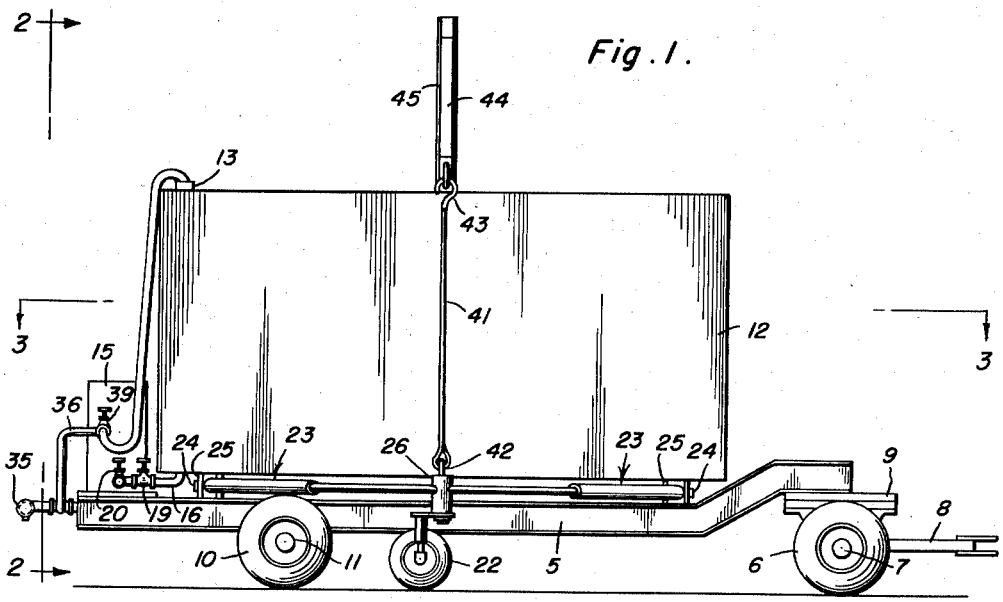
Figure 1 is a side elevational view of a spraying machine embodying the present invention.

Referring in detail to the drawings, the present machines embodies a vehicle frame including a pair of spaced longitudinal frame members 5 supported at their forward ends by a steering truck including front steering and supporting wheels 6 which are journaled on the ends of horizontally swingable front axle 7 having a forwardly extending draft tongue 8. A conventional fifth wheel 9 is provided between the axle 7 and the frame members 5. The frame members 5 are also supported near their rear ends by rear supporting wheels 10 journaled on the ends of a transverse rear axle 11. Mounted on and between the ends of the longitudinal frame members 5 is a large water reservoir or tank 12 having a top inlet 13 and a bottom outlet 14 at the rear thereof.

Mounted on the rear ends of the longitudinal frame members 5 directly behind the tank 12 is an encased pumping unit 15 of the type including an engine-driven pump having its inlet connected to the outlet 14 of the tank by a valved conduit 16 having a valved branch 17 adapted at 18 to have a hose connected thereto. The hose is adapted to be extended to a suitable outside source of water supply. The branch 17 is provided between the valve 19 in conduit 16 and the pump, and the valve in branch 17 is indicated at 20. The arrangement is such that when valve 19 is closed and valve 20 is opened, the pump of unit 15 may draw water through the hose connected to the branch 17 for being forced into the tank 12 through its inlet 13 in a manner which will be presently explained. On the other hand, when valve 19 is opened and valve 20 is closed, the pump of unit 15 receives its supply of water from the tank 12 when the machine is used for spraying in the field.

Spray booms 21, having supporting caster wheels 22 on their outer ends, extend laterally beyond opposite sides of the tank and are detachably and pivotally connected by guy rods 23 to the frame for vertical swinging movement so as to rise and fall according to uneven conditions of the ground on which the caster wheels 23 roll. The guy rods 23 are preferably of telescopic construction as shown for adjustment as to length, and removable pivot pins 24 detachably and pivotally connect the inner ends of said guy rods to transverse frame members 25 secured upon and extending across the longitudinal frame members 5 and laterally beyond the latter. The guy rods 23 are disposed at opposite sides of each spray boom and extend outwardly in converging relation so as to connect at their outer ends to the mount 26 of the associated caster wheel 22.

Figures 5, 6:
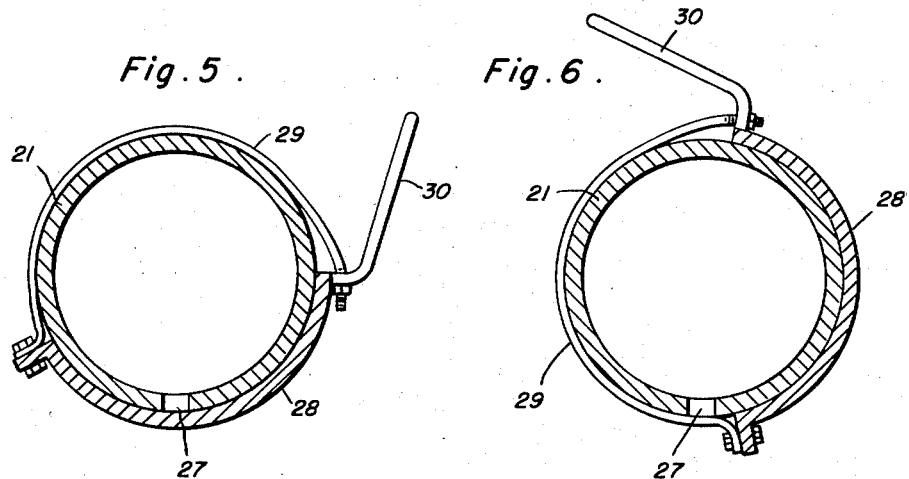
Figure 5 is an enlarged transverse section through one of the spray booms taken on line 5—5 of Figure 4.
Figure 6 is a view similar to Figure 5 showing the valve of the spray boom in open position.
Figure 3:
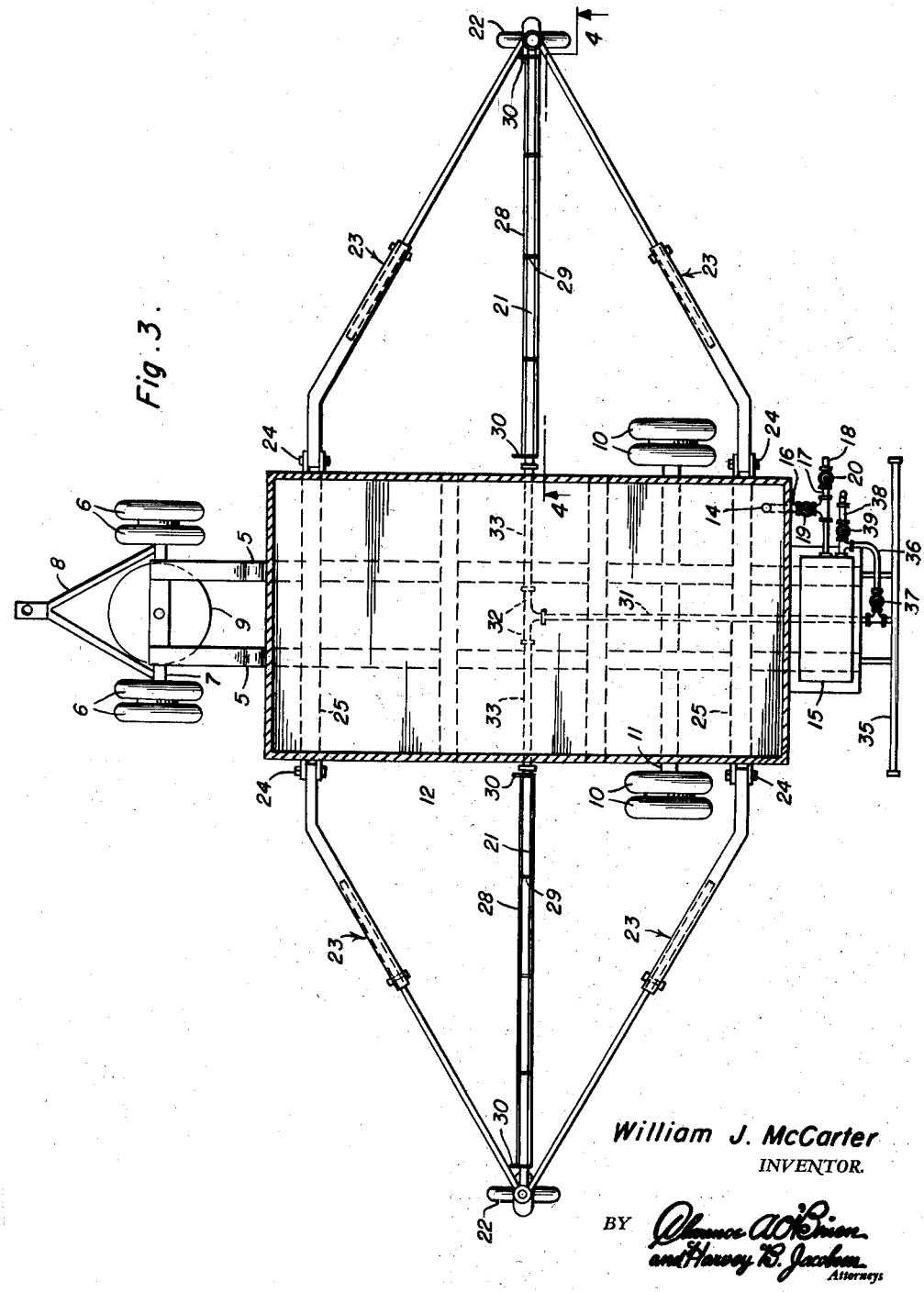
Figure 3 is a horizontal section taken on line 3—3 of Figure 1.

As shown, each spray boom 21 consists of a length of pipe rigidly joined at its outer end to the mount 26 of the associated caster wheel and provided through its underside and substantially along its entire length with a series of uniformly spaced discharge or spray openings 27. A channel shaped valve member 28 is disposed on and snugly fits about the outside of each spray boom 21 and is rotatably retained thereon by means of a plurality of straps 29 connected at the ends to opposite longitudinal edges of the valve member 28 as shown more clearly in Figures 5 and 6. At its ends, each valve member 28 is provided with handles 30 for use in manually turning the valve member about the axis of the associated spray boom so as to close the spray openings 27 as in Figure 5 or to open them as in Figure 6. Thus, either spray boom may be closed whenever desired without shutting down the pumping unit.

A manifold 31 is mounted longitudinally of the frame beneath the tank 12 and has lateral branches 32 at its front end flexibly and detachably coupled by means of hose at 33 to the inner ends of the spray booms 21, the hose at 33 being fastened to the underside of tank 12 as at 34 near the inner ends of the booms 21 to support said booms at their inner ends. A horizontal spray pipe 35 is mounted transversely of and on the rear end of the frame behind the pumping unit 15, and is connected intermediate its ends to the rear end of the manifold 31. This spray pipe 35 is preferably of the type having an internal rotary valve sleeve for closing and opening its spray openings which are provided on the underside and substantially along the entire length of the pipe 35 according to well known practice.

Near its rear end, the manifold 31 is connected to the outlet of the pump of unit 15 by a valved conduit 36 whose control valve is indicated at 37 and which has a branch 38 provided with a control valve 39. By coupling a hose 40 to the branch 38 and extending it into the inlet 13 as shown, the water pumped from an outside source may be pumped into the tank 12 for filling the same. In other words, the pump may draw water through a hose from a suitable source of water supply to the branch 17 when valve 20 is open and valve 19 is closed, and this water may be delivered by the pump through branch 38 and hose 40 into the tank when valve 39 is opened and valve 37 is closed. On the other hand, when valves 20 and 39 are closed and valves 19 and 37 are opened, the pump will deliver water from tank 12 to the spray booms 21 and spray pipe 35.

Guy cables 41 are provided to limit the downward movement of the spray booms to an excessive extent, and these guy cables are attached at their outer lower ends to the caster wheel mounts 26 as at 42 and are detachably connected at their inner upper ends as at 43 to brackets 44 secured on top of the tank and braced to a mast 45 fixed on top of the latter.

By disconnecting the guy cables 41 from the brackets 44, disconnecting the guy rods 23 from the transverse frame members 25, and uncoupling the hose 33 from the spray booms 21, said spray booms may be detached from the machine to facilitate travel of the same from place to place when not in use. A tractor may be readily coupled to the draft tongue 8 for drawing the machine over the field when spraying the latter, and it will be apparent that the machine can be used to simultaneously spray several rows of plants.

From the foregoing description, it is noted that the construction, operation and advantages of the present invention will be readily understood and appreciated by those skilled in the art. Modifications and changes in details of construction are contemplated, such as fairly fall within the spirit and scope of the invention as claimed.

Having described the invention, what is claimed as new is:

A portable spraying machine comprising a vehicle having a chassis, a liquid reservoir mounted on said vehicle, said reservoir having an inlet at the top and an outlet at the bottom rear part thereof, a power-operated pump mounted on said vehicle having an inlet and outlet, a pipe connecting said pump inlet to said reservoir outlet, a valve between said pump and said reservoir outlet, a branch pipe connected to said first-mentioned pipe and having an outlet, said last-mentioned branched pipe outlet adapted to have a hose coupled thereto for conveying liquid to said branched pipe for passage to said reservoir when said hose is extended to an outside source of liquid, a valve in said branch outlet pipe, spray booms carried by said vehicle and adapted to extend laterally at opposite sides of said reservoir, a manifold mounted longitudinally of said vehicle beneath said reservoir and connected to said spray booms for delivering liquid thereto, a pipe connecting said manifold with the outlet of said pump, a valve in said last-mentioned pipe, a branch line connected to said last-mentioned pipe and extending to the top of said reservoir, a valve in said last-mentioned branch line, an auxiliary horizontally extending spray pipe mounted centrally and transversely of and at the rear end of said vehicle, said horizontal spray pipe communicating with said manifold, wheels mounted on the outer ends of said lateral spray booms for supporting the same, and flexible conduit means connecting said laterally extending spray booms to said manifold for providing for vertical swinging movement of said booms so that they may rise and fall as required by the uneven ground conditions over which said spraying machine is drawn, openings spaced longitudinally of said spray booms and said horizontal spray pipe for discharging liquid downwardly relative to said reservoir, a pair of vertically swingable guy rods disposed at opposite sides of each of said spray booms, said guy rods converging outwardly from the vehicle and being fixed at their outermost end portions to the respective mountings of said wheels disposed on the outer ends of said booms, brackets secured on top of the reservoir at opposite sides of the latter, guy cables connecting said wheel mounting to said brackets, a mast fixed on top of said reservoir between said brackets, the latter being secured at their upper ends to said mast and bracing the same.

WILLIAM J. McCARTER.

(References on following page)

REFERENCES CITED

The following references are of record in the file of this patent:

UNITED STATES PATENTS

| Number | Name | Date |
|---|---|---|
| 304,024 | Pharo | Aug. 26, 1884 |
| 483,269 | Talley | Sept. 27, 1892 |
| 1,633,294 | Stubenberg | June 21, 1927 |
| 1,755,716 | Thompson | Apr. 22, 1930 |
| 2,086,055 | Taylor | July 6, 1937 |
| 2,246,866 | Stribling et al. | June 24, 1941 |
| 2,359,300 | Cartwright | Oct. 3, 1944 |
| 2,381,649 | Dalton | Aug. 7, 1945 |

FOREIGN PATENTS

| Number | Country | Date |
|---|---|---|
| 19,169 | Great Britain | Sept. 5, 1904 |
| 37,954 | Denmark | Sept. 19, 1927 |
| 63,210 | Denmark | Feb. 26, 1945 |